US011639565B2

(12) United States Patent
Lee et al.

(10) Patent No.: US 11,639,565 B2
(45) Date of Patent: May 2, 2023

(54) HYBRID TIRE CORD AND METHOD FOR MANUFACTURING THE SAME

(71) Applicant: KOLON INDUSTRIES, INC., Seoul (KR)

(72) Inventors: Min Ho Lee, Yongin-si (KR); Ok Wha Jeon, Yongin-si (KR); Jong Ha Yim, Yongin-si (KR); Da Ae Kim, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 1072 days.

(21) Appl. No.: 16/336,614

(22) PCT Filed: Sep. 29, 2017

(86) PCT No.: PCT/KR2017/011026
§ 371 (c)(1),
(2) Date: Mar. 26, 2019

(87) PCT Pub. No.: WO2018/062960
PCT Pub. Date: Apr. 5, 2018

(65) Prior Publication Data
US 2021/0207295 A1 Jul. 8, 2021

(30) Foreign Application Priority Data

Sep. 29, 2016 (KR) .................. 10-2016-0125412
Dec. 30, 2016 (KR) .................. 10-2016-0183260

(51) Int. Cl.
*D02G 3/48* (2006.01)
*B60C 9/00* (2006.01)
*D02G 3/04* (2006.01)
*D02G 3/28* (2006.01)

(52) U.S. Cl.
CPC ............ *D02G 3/48* (2013.01); *B60C 9/005* (2013.01); *B60C 2009/0092* (2013.01); *D02G 3/047* (2013.01); *D02G 3/28* (2013.01); *D07B 2501/2046* (2013.01); *D10B 2505/022* (2013.01)

(58) Field of Classification Search
CPC . D02G 3/047; D02G 3/28; D02G 3/48; D07B 2501/2046; D10B 2505/022; B60C 9/005
See application file for complete search history.

(56) References Cited

U.S. PATENT DOCUMENTS

| | | | |
|---|---|---|---|
| 4,155,394 A | | 5/1979 | Shepherd et al. |
| 7,051,507 B2 * | | 5/2006 | Fritsch .................. B60C 9/005 57/314 |
| 9,175,425 B2 * | | 11/2015 | Love .................. H01B 13/0003 |
| 9,617,663 B2 * | | 4/2017 | Jeon .................. D02G 3/40 |
| 9,789,731 B2 * | | 10/2017 | Lee .................. B60C 9/005 |
| 2007/0017620 A1 | | 1/2007 | Donckels et al. |
| 2010/0263781 A1 | | 10/2010 | Yamaguchi |
| 2014/0120791 A1 | | 5/2014 | Renken et al. |
| 2014/0237983 A1 * | | 8/2014 | Love .................. D02G 3/04 57/58.7 |
| 2015/0217603 A1 | | 8/2015 | Fidan et al. |
| 2015/0239301 A1 | | 8/2015 | Vallet et al. |
| 2015/0246582 A1 | | 9/2015 | Montezin |
| 2015/0292124 A1 | | 10/2015 | Lee et al. |
| 2015/0375573 A1 | | 12/2015 | Nakazato et al. |
| 2016/0107485 A1 | | 4/2016 | Lee et al. |
| 2016/0376733 A1 | | 12/2016 | Jeon et al. |
| 2017/0106698 A1 | | 4/2017 | Jeon et al. |
| 2017/0246913 A1 | | 8/2017 | Reese |

FOREIGN PATENT DOCUMENTS

| | | |
|---|---|---|
| CN | 1900399 A | 1/2007 |
| CN | 104919099 A | 9/2015 |
| CN | 105525410 A | 4/2016 |
| DE | 102007025490 A1 | 12/2008 |
| DE | 102014220518 A1 | 4/2016 |
| EP | 2 233 318 A1 | 9/2010 |
| JP | 54-45007 A | 4/1979 |
| JP | 60-45401 A | 3/1985 |
| JP | 61-71204 A | 4/1986 |
| JP | 62-39302 A | 2/1987 |
| JP | 04271904 A | 9/1992 |
| JP | 05262104 A | 10/1993 |
| JP | 09240213 | 9/1997 |
| JP | 2005-22455 A | 1/2005 |
| JP | 2009190728 | 8/2009 |

(Continued)

OTHER PUBLICATIONS

The Miracle of Science, 11th Brazilian Congress of Rubber Technology, May 10-12, 2006.

(Continued)

*Primary Examiner* — Shaun R Hurley
(74) *Attorney, Agent, or Firm* — Harvest IP Law, LLP

(57) ABSTRACT

Disclosed are a high-performance hybrid tire cord capable of realizing high performance and lightweight of a tire, and a method for manufacturing same. The hybrid tire cord of the present invention comprises a PET primarily-twisted yarn, an aramid primarily-twisted yarn, and an adhesive coated on the PET primarily-twisted yarn and the aramid primarily-twisted yarn. In the hybrid tire cord having a predetermined length, the length of the aramid primarily-twisted yarn is 1 to 1.1 times the length of the PET primarily-twisted yarn, after the secondary twist is untwisted.

19 Claims, No Drawings

(56) References Cited

FOREIGN PATENT DOCUMENTS

| JP | 2011500427 | 1/2011 |
|----|------------|--------|
| JP | 2011143899 | 7/2011 |
| JP | 2015-536269 A | 12/2015 |
| JP | 2016500769 A | 1/2016 |
| JP | 2017-14678 A | 1/2017 |
| KR | 10-2007-0046572 A | 5/2007 |
| KR | 10-2015-0055619 A | 5/2015 |
| KR | 10-2015-0071701 A | 6/2015 |
| KR | 10-2015-0073955 A | 7/2015 |
| KR | 10-1602605 B1 | 3/2016 |
| KR | 101602605 B1 | 3/2016 |
| KR | 2016506453 A | 3/2016 |
| WO | 2014/057082 A1 | 4/2014 |

OTHER PUBLICATIONS

Notice of Opposition dated Mar. 5, 2021.
International Search Report for PCT/KR2017/011026 dated Jan. 29, 2018 (PCT/ISA/210).
Communication dated May 11, 2020 from European Patent Office in EP Application No. 17856846.5.

* cited by examiner

HYBRID TIRE CORD AND METHOD FOR MANUFACTURING THE SAME

CROSS REFERENCE TO RELATED APPLICATIONS

This application is a National Stage of International Application No. PCT/KR2017/011026 filed Sep. 29, 2017, claiming priorities based on Korean Patent Application Nos. 10-2016-0125412 filed Sep. 29, 2016 and 10-2016-0183260 filed Dec. 30, 2016.

TECHNICAL FIELD

The present disclosure relates to a hybrid tire cord and a method of manufacturing the same, and more particularly to a high-performance hybrid tire cord that is capable of realizing the high performance and light weight of a tire and a method of manufacturing the same. In addition, the present disclosure relates to a hybrid cord for carcasses and a method of manufacturing the same.

BACKGROUND ART

A fiber cord, particularly a "dip cord," which is a fiber cord treated with an adhesive, has been widely used as a reinforcement material for rubber products, such as tires, conveyor belts, V-belts, and hoses. The fiber cord is made of a nylon fiber, a polyester fiber, a rayon fiber, etc. One of the important methods of improving the performance of finished rubber products is to improve the physical properties of a fiber cord, which is used as a reinforcement material therefor.

Meanwhile, a fiber cord used as a reinforcement material for tires is referred to as a tire cord. With the improvement of the performance of vehicles and the state of roads, the traveling speed of vehicles has gradually increased. Therefore, research has been actively conducted into a tire cord that is capable of maintaining the stability and durability of tires even when the vehicles travel at high speeds.

In addition, as the demand for eco-friendly vehicles has increased, a reduction in the weight of vehicles for high fuel efficiency has been at issue. To this end, research has also actively been conducted into a reduction in the weight of tires.

A tire, which is a complex of a fiber, metal, and rubber, includes a tread, which is disposed at the outermost side thereof so as to contact a road surface, a cap ply, disposed under the tread, a belt, disposed under the cap ply, and a carcass, disposed under the belt. In order to reduce the weight of the tire, it is necessary to increase the performance of a tire cord, which is a fiber component.

A hybrid tire cord, which is made of nylon and aramid, has been developed in order to increase the performance of the tire cord. However, the hybrid tire cord has a problem in which the physical properties of nylon initially appear in an S-S curve pattern, whereby the modulus of the hybrid tire cord is low.

DISCLOSURE

Technical Problem

The present disclosure relates to a hybrid tire cord that is capable of solving problems caused by the limitations and shortcomings of the related art described above and a method of manufacturing the same.

It is an object of the present disclosure to provide a high-performance hybrid tire cord that is capable of realizing the high performance and light weight of a tire.

It is another object of the present disclosure to provide a method of manufacturing a high-performance hybrid tire cord that is capable of realizing the high performance and light weight of a tire with high productivity and at low expense while minimizing variation in the physical properties of the high-performance hybrid tire cord.

It is another object of the present disclosure to provide a hybrid tire cord for carcasses that has high strength, high modulus, and excellent fatigue tolerance so as to realize the high performance and light weight of a tire.

It is a further object of the present disclosure to provide a method of manufacturing a hybrid tire cord for carcasses that has high strength, high modulus, and excellent fatigue tolerance so as to realize the high performance and light weight of a tire, with high productivity and at low expense while minimizing variation in the physical properties of the hybrid tire cord for carcasses.

Other features and advantages of the present disclosure will be described hereinafter, and may be made obvious in part from the following description. Otherwise, other features and advantages of the present disclosure will be understood through implementation of the present disclosure. The objects and other advantages of the present disclosure will be realized and achieved by the structure specified in the detailed description of the present disclosure and the appended claims.

Technical Solution

In accordance with an aspect of the present disclosure, the above and other objects can be accomplished by the provision of a hybrid tire cord including PET primarily twisted yarn, aramid primarily twisted yarn, and an adhesive coated on the PET primarily twisted yarn and on the aramid primarily twisted yarn, wherein the PET primarily twisted yarn and the aramid primarily twisted yarn are secondarily twisted with each other, and the length of the aramid primarily twisted yarn is 1 to 1.1 times the length of the PET primarily twisted yarn after a predetermined length of the hybrid tire cord is untwisted.

The PET primarily twisted yarn may be made of PET filaments having 400 to 3000 denier, and the aramid primarily twisted yarn may be made of aramid filaments having 400 to 3000 denier.

More specifically, the PET primarily twisted yarn may have 1300 to 3000 denier, and the aramid primarily twisted yarn may have 1500 to 3000 denier.

The PET primarily twisted yarn may have a first twisting direction, the aramid primarily twisted yarn may have a second twisting direction, the PET primarily twisted yarn and the aramid primarily twisted yarn may be secondarily twisted with each other in a third twisting direction, the second twisting direction may be the same as the first twisting direction, and the third twisting direction may be opposite the first twisting direction.

Each of the PET primarily twisted yarn and the aramid primarily twisted yarn may have a first twist number of 200 to 500 TPM.

The PET primarily twisted yarn and the aramid primarily twisted yarn may be secondarily twisted with each other so as to have a second twist number, and the second twist number may be the same as the first twist number.

The weight ratio of the aramid primarily twisted yarn to the PET primarily twisted yarn may be 20:80 to 80:20.

More specifically, the weight ratio of the aramid primarily twisted yarn to the PET primarily twisted yarn may be 1:3 to 3:1.

The hybrid tire cord may have a strength at break of 8.0 to 15.0 g/d, measured according to ASTM D885, and an elongation at break of 5 to 15%, measured according to ASTM D885.

The strength retention rate of the hybrid tire cord after disk fatigue testing, performed according to the JIS-L 1017 method of Japanese Standards Association (JSA), may be 80% or higher.

The hybrid tire cord may have 3% LASE of 6 kgf or more, 5% LASE of 10 kgf or more), and 7% LASE of 17 kgf or more, measured according to ASTM D885.

More specifically, the hybrid tire cord may have 3% LASE of 8 kgf or more, 5% LASE of 15 kgf or more, and 7% LASE of 25 kgf or more, measured according to ASTM D885.

The dry heat shrinkage of the hybrid tire cord, measured under conditions of a temperature of 180° C., a time of 2 minutes, and a primary load of 0.01 g/d, may be 0.3 to 2.5%.

In accordance with another aspect of the present disclosure, there is provided a method of manufacturing a hybrid tire cord, the method including primarily twisting aramid filaments in a first direction to form aramid primarily twisted yarn, primarily twisting PET filaments in a second direction to form PET primarily twisted yarn, secondarily twisting the aramid primarily twisted yarn and the PET primarily twisted yarn with each other in a third direction to form cabled yarn, dipping the cabled yarn in an adhesive solution, drying the cabled yarn penetrated with the adhesive solution as the result of being dipped, and heat treating the dried cabled yarn, wherein the second direction is the same as the first direction, the third direction is opposite the first direction, and the tension applied to the PET filament in forming the PET primarily twisted yarn is lower than the tension applied to the aramid filament in forming the aramid primarily twisted yarn.

The length of the PET primarily twisted yarn may be 1.005 to 1.050 times the length of the aramid primarily twisted yarn after a predetermined length of the cabled yarn, formed at the step of forming the cabled yarn, is untwisted.

The tension applied to the PET filament in forming the PET primarily twisted yarn may be 50% to 95% of the tension applied to the aramid filament in forming the aramid primarily twisted yarn.

Forming the aramid primarily twisted yarn, forming the PET primarily twisted yarn and forming the cabled yarn may be performed in a single twisting machine.

Forming the aramid primarily twisted yarn and the PET primarily twisted yarn, and forming the cabled yarn may be successively performed.

The adhesive solution may include at least one of a resorcinol-formaldehyde-latex (RFL) adhesive and an epoxy-based adhesive.

The drying may be performed at 70 to 200° C. for 30 to 120 seconds, and the heat treating may be performed at 200 to 250° C. for 30 to 120 seconds.

The dipping, the drying, and the heat treating may be successively performed, and the tension applied to the cabled yarn at the dipping, the drying, and the heat treating may be 0.4 kg/cord or higher.

After the heat treating, the length of the aramid primarily twisted yarn, measured after the hybrid tire cord is untwisted, may be 1 to 1.1 times the length of the PET primarily twisted yarn.

In accordance with a further aspect of the present disclosure, there is provided a hybrid tire cord for carcasses, the hybrid tire cord including PET primarily twisted yarn, aramid primarily twisted yarn, and an adhesive coated on the PET primarily twisted yarn and on the aramid primarily twisted yarn, wherein the PET primarily twisted yarn and the aramid primarily twisted yarn are secondarily twisted with each other, and the length of the aramid primarily twisted yarn is 1 to 1.1 times the length of the PET primarily twisted yarn after a predetermined length of the hybrid tire cord is untwisted.

The general description of the present disclosure given above and the detailed description of the present disclosure given below are provided only for the illustration or description of the present disclosure, and should be construed as providing a more detailed description of the present disclosure defined by the accompanying claims.

Advantageous Effects

According to an embodiment of the present disclosure, primary twisting and secondary twisting are performed using a single twisting machine in order to manufacture cabled yarn, whereby the productivity of a hybrid tire cord may be improved and the cost of manufacturing the hybrid tire cord may be reduced. In addition, it is possible to manufacture a hybrid tire cord having an excellent strength retention rate of 80% or more using a manufacturing method according to an embodiment of the present disclosure.

A hybrid tire cord according to an embodiment of the present disclosure, manufactured using the above manufacturing method, may have high-performance and lightweight characteristics, and may be applied to a high-pressure tire.

More specifically, the hybrid tire cord according to the embodiment of the present disclosure may minimize the deformation of a tire during high-speed travel due to the high strength of aramid primarily twisted yarn.

In the hybrid tire cord according to the embodiment of the present disclosure, the aramid primarily twisted yarn and the primarily twisted yarn may have substantially the same twist number and substantially the same length, whereby the structural stability of the hybrid tire cord is excellent. Consequently, it is possible to minimize variation in the physical properties of the hybrid tire cord and the defect rate of the hybrid tire cord, which may be caused during the manufacture of the hybrid tire cord.

According to an embodiment of the present disclosure, the length of the aramid primarily twisted yarn is 1 to 1.1 times the length of the PET primarily twisted yarn after the tire cord is untwisted. When the tire is repeatedly tensioned and contracted, therefore, the stress applied to the tire cord may be distributed to the PET primarily twisted yarn as well as the aramid primarily twisted yarn. As a result, the hybrid tire cord according to the embodiment of the present disclosure has excellent fatigue tolerance, by which the stability of the tire is guaranteed even during high-speed travel for a long time due.

In addition, the hybrid tire cord according to the embodiment of the present disclosure is capable of minimizing the deformation of the tire during high-speed travel, and may be usefully applied to a carcass of a high-pressure tire that needs to withstand a high load and to exhibit high stability in the shape (dimensional stability) thereof, for example, a tire for large-sized vehicles, such as SUVs and LTs.

According to an embodiment of the present disclosure, it is possible to minimize a reduction in the strength and modulus of the hybrid tire cord, which may be caused during the manufacture of the hybrid tire cord, particularly during heat treating.

BEST MODE

Hereinafter, embodiments of a hybrid tire cord, a hybrid tire cord for carcasses, and a method of manufacturing the same according to the present disclosure will be described in detail.

Those skilled in the art will appreciate that various modifications, additions and substitutions are possible, without departing from the scope and spirit of the present disclosure as disclosed in the accompanying claims. Accordingly, the present disclosure encompasses the disclosure defined in the claims and modifications and alterations that fall within the scope of the equivalents thereto.

The term "primarily twisted yarn" used in the present specification means yarn that is obtained by twisting filaments in one direction. Here, "filaments" has a meaning including both a monofilament and a multifilament. According to an embodiment of the present disclosure, the primarily twisted yarn may be made of filament yarn. In the case in which the primarily twisted yarn is made of a strand of yarn, the primarily twisted yarn may also be called single yarn.

The term "cabled yarn" used in the present disclosure means a yarn that is obtained by twisting two or more strands of primarily twisted yarn in one direction. According to an embodiment of the present disclosure, the cabled yarn may also be called a raw cord.

The term "tire cord" used in the present disclosure means a cabled yarn containing an adhesive so as to be directly applied to rubber products. According to an embodiment of the present disclosure, the tire cord may also be called a dip cord.

The term "twist number" used in the present disclosure means the number of twists per meter, and is expressed in twists per meter (TPM).

The acronym "LASE" used in the present disclosure stands for "load at specific elongation." For example, 3% LASE means load at an elongation of 3%.

In order to develop a high-performance tire cord, the structural characteristics of a material, such as the twist number and shape of the material, as well as the physical properties of the material must be considered.

An embodiment of the present disclosure provides a hybrid tire cord.

The hybrid tire cord according to the embodiment of the present disclosure, which is a hybrid type tire cord including PET and aramid, includes PET primarily twisted yarn, aramid primarily twisted yarn, and an adhesive coated on the PET primarily twisted yarn and on the aramid primarily twisted yarn. Here, the PET primarily twisted yarn and the aramid primarily twisted yarn are secondarily twisted with each other. After a predetermined length of the hybrid tire cord according to the embodiment of the present disclosure is untwisted, the length of the aramid primarily twisted yarn is 1 to 1.1 times the length of the PET primarily twisted yarn.

Specifically, the hybrid tire cord according to the embodiment of the present disclosure includes PET primarily twisted yarn, twisted in a first twisting direction, and aramid primarily twisted yarn, twisted in a second twisting direction, wherein the PET primarily twisted yarn and the aramid primarily twisted yarn are secondarily twisted with each other in a third twisting direction. The hybrid tire cord according to the embodiment of the present disclosure includes cabled yarn, which is obtained by secondarily twisting PET primarily twisted yarn and aramid primarily twisted yarn.

For example, PET filaments and aramid filaments are simultaneously primarily twisted using a single twisting machine (for example, a cable cord twisting machine, such as Cable Corder made by Allma Company) in order to form PET primarily twisted yarn and aramid primarily twisted yarn, and at almost the same time, i.e. successively, the PET primarily twisted yarn and the aramid primarily twisted yarn are secondarily twisted with each other, whereby cabled yarn, which is a raw cord, is formed.

The second twisting direction of the aramid primarily twisted yarn is the same as the first twisting direction of the PET primarily twisted yarn, and the third twisting direction, i.e. the secondary twisting direction, is opposite the first twisting direction.

According to an embodiment of the present disclosure, the PET primarily twisted yarn and the aramid primarily twisted yarn may have the same twist number. For example, the PET primarily twisted yarn and the aramid primarily twisted yarn may have the same twist number within a range of 200 to 500 TPM. That is, each of the PET primarily twisted yarn and the aramid primarily twisted yarn may have a first twist number of 200 to 500 TPM. In addition, the PET primarily twisted yarn and the aramid primarily twisted yarn may be secondarily twisted with each other so as to have a second twist number, and the second twist number may be the same as the first twist number.

According to an embodiment of the present disclosure, primary twisting and secondary twisting are performed using a single twisting machine, whereby the productivity of the hybrid tire cord is improved and the cost of manufacturing the hybrid tire cord is reduced, compared to a batch type method in which primary twisting and secondary twisting are performed using different twisting machines.

Since aramid has a linear molecular chain, the degree of crystallinity of aramid is high, and contraction of aramid due to heat is slight. In contrast, PET filaments, which are manufactured through a stretching process in order to realize the high strength and high modulus required for a tire cord, contract during a heat treating process that is performed at the time of manufacturing a hybrid tire cord (dip cord), whereby a difference in the length between the aramid primarily twisted yarn and the PET primarily twisted yarn occurs in the finished tire cord, which may lead to nonuniformity in the physical properties of the hybrid tire cord. In the case in which the shape of the dip cord becomes nonuniform due to the contraction of the PET primarily twisted yarn, the aramid primarily twisted yarn and the PET primarily twisted yarn may be separated from each other, whereby the strength of the dip cord is reduced, and the fatigue tolerance of the dip cord is also reduced. For example, in the case in which a difference in the length between the aramid primarily twisted yarn and the PET primarily twisted yarn occurs in the hybrid tire cord, which is the finished product, to such an extent that the length of the aramid primarily twisted yarn becomes more than 1.1 times the length of the PET primarily twisted yarn, the strength and modulus of the hybrid tire cord are reduced, and the fatigue tolerance of the hybrid tire cord is also reduced.

According to an embodiment of the present disclosure, therefore, the tension applied to each of the aramid primarily twisted yarn and the PET primarily twisted yarn is adjusted during a twisting process such that the PET primarily twisted yarn is longer than the aramid primarily twisted yarn in order to manufacture a hybrid tire cord that has high strength and fatigue tolerance. In addition, relatively high tension (for example, 0.4 kg/cord or high) may be applied to the cabled yarn (raw cord) in order to minimize contraction of the PET primarily twisted yarn during the heat treating process. As a result, the aramid primarily twisted yarn and the PET primarily twisted yarn may have substantially the same length and structure in the completed hybrid tire cord.

Specifically, the tension applied to each of the aramid primarily twisted yarn and the PET primarily twisted yarn is appropriately adjusted at the time of performing the twisting process such that the aramid primarily twisted yarn and the PET primarily twisted yarn have substantially the same structure in the finished hybrid tire cord. That is, higher tension may be applied to the aramid filaments than to the PET filaments when primary twisting and secondary twisting are performed such that the length of the PET primarily twisted yarn becomes greater than the length of the aramid primarily twisted yarn.

According to an embodiment of the present disclosure, the length of the PET primarily twisted yarn is 1.005 to 1.050 times the length of the aramid primarily twisted yarn after a predetermined length of the cabled yarn (raw cord) is untwisted. Consequently, the cabled yarn (raw cord) according to the embodiment of the present disclosure may have a merged structure with slightly covering structure, that is, a merge structure including a structure in which the PET primarily twisted yarn covers the aramid primarily twisted yarn, i.e. a "covering structure."

According to an embodiment of the present disclosure, the length of the PET primarily twisted yarn is greater than the length of the aramid primarily twisted yarn in the cabled yarn (raw cord). Consequently, it is possible to prevent the length of the aramid primarily twisted yarn from becoming much greater than the length of the PET primarily twisted yarn in the finished hybrid tire cord (i.e. dip cord) due to the contraction of the PET primarily twisted yarn caused when subsequent dipping, drying, and heat treating processes are sequentially performed in order to provide an adhesive.

According to an embodiment of the present disclosure, the length of the aramid primarily twisted yarn is 1 to 1.1 times the length of the PET primarily twisted yarn after a predetermined length of the finished hybrid tire cord is untwisted.

In the case in which the aramid primarily twisted yarn is shorter than the PET primarily twisted yarn in the hybrid tire cord, i.e. in the case in which the length of the PET primarily twisted yarn is more than 1.050 times the length of the aramid primarily twisted yarn in the cabled yarn (raw cord), the stress applied to the tire cord when tension and compression of the tire are repeated is concentrated on the aramid primarily twisted yarn, whereby the fatigue tolerance of the tire cord is low, and the stability of the tire is not guaranteed during high-speed travel for a long time due to the low fatigue tolerance of the tire cord.

In contrast, in the case in which the length of the PET primarily twisted yarn is less than 1.005 times the length of the aramid primarily twisted yarn in the cabled yarn (raw cord), a hybrid tire cord having a covering structure in which the length of the aramid primarily twisted yarn is more than 1.1 times the length of the PET primarily twisted yarn is finally obtained. The aramid primarily twisted yarn, which covers the PET primarily twisted yarn, is pushed as the result of rubbing against a guide or a roller to form a loop, whereby the shape of the aramid primarily twisted yarn becomes nonuniform, in the hybrid tire cord having the covering structure. At the time of manufacturing the hybrid tire cord, therefore, variation in the physical properties of the hybrid tire cord and the defect rate of the hybrid tire cord are increased, and the defect rate of the tire is increased even at the time of manufacturing the tire due to the variation in the physical properties of the hybrid tire cord.

According to an embodiment of the present disclosure, the same twist number may be applied within a range of 200 to 500 TPM when primary twisting and secondary twisting are performed in order to manufacture the cabled yarn (raw cord). When subsequent dipping, drying, and heat treating processes are sequentially performed in order to provide an adhesive, however, unintended untwisting may occur, whereby the twist number in the primary twisting and the secondary twisting may be different from the initially set twist number within a range of 15%. In general, when the twist number of fibers is high, the strength of the fibers is decreased, but the fatigue tolerance of the fibers is increased. In contrast, when the twist number of fibers is low, the strength of the fibers is increased, but the fatigue tolerance of the fibers is decreased.

According to an embodiment of the present disclosure, the aramid primarily twisted yarn and the PET primarily twisted yarn have substantially the same twist number, length, and structure, whereby the aramid primarily twisted yarn and the PET primarily twisted yarn have similar strength and fatigue tolerance.

The aramid filaments and the PET filaments used to manufacture the hybrid tire cord according to the embodiment of the present disclosure are not particularly restricted. The aramid filaments and the PET filaments applied respectively to the aramid primarily twisted yarn and the PET primarily twisted yarn may have the same or similar denier within a range of 400 to 3000 denier. For example, the PET primarily twisted yarn according to the embodiment of the present disclosure is PET filament yarn including PET filaments having 400 to 3000 denier, and the aramid primarily twisted yarn is aramid filament yarn including aramid filaments having 400 to 3000 denier. This hybrid tire cord may be applied to a high-performance lightweight tire.

Meanwhile, the PET primarily twisted yarn may have 1300 to 3000 denier, and the aramid primarily twisted yarn may have 1500 to 3000 denier. The hybrid tire cord including the aramid primarily twisted yarn and the PET primarily twisted yarn having the above-defined denier may be particularly usefully applied to a high-pressure tire.

Aramid includes a phenyl ring together with an amid group in a main chain, and is classified as a para type (P-) or a meta type (m-) depending on the bonding state of the phenyl ring. According to an embodiment of the present disclosure, the aramid primarily twisted yarn may include poly(P-phenylene terephthalamide).

According to an embodiment of the present disclosure, the aramid filament has a tensile strength of 20 g/d or higher and an elongation at break of 3% or higher. If the tensile strength of the aramid filament is less than 20 g/d, the aramid filament cannot sufficiently compensate for the low strength of the PET filament yarn, whereby the tire may be deformed during high-speed travel.

In addition, the aramid filament has a modulus 5 to 10 times as high as that of the PET filament. Even in the case in which the weight ratio of the aramid primarily twisted yarn to the PET primarily twisted yarn is about 15:85 in the hybrid tire cord, the hybrid tire cord has a modulus 2 to 3 times as high as that of a tire cord made of a PET material alone. Consequently, it is possible to set the weight ratio of the aramid primarily twisted yarn to the PET primarily twisted yarn in consideration both of the physical properties of the tire cord and of the cost of manufacturing the tire cord.

According to an embodiment of the present disclosure, the weight ratio of the aramid primarily twisted yarn to the PET primarily twisted yarn ranges from 20:80 to 80:20.

If the weight of the PET primarily twisted yarn is more than 4 times the weight of the aramid primarily twisted yarn, the finished hybrid tire cord shows the physical properties of PET, whereby the strength and modulus of the hybrid tire cord are reduced. Consequently, the hybrid tire cord is not suitable for use as a tire cord for high-pressure tires, which require high dimensional stability. In addition, a large number of tire cords must be used in order to restore insufficient strength and modulus, whereby it becomes impossible to reduce the weight of the tire.

In contrast, if the weight of the aramid primarily twisted yarn is more than 4 times the weight of the PET primarily twisted yarn, the fatigue tolerance of the hybrid tire cord is reduced, whereby it is difficult to guarantee the durability of the tire. In addition, a large amount of aramid, which is expensive, is used, whereby cost is increased.

More specifically, the weight ratio of the aramid primarily twisted yarn to the PET primarily twisted yarn may be adjusted within a range of 1:3 to 3:1.

The hybrid tire cord according to the embodiment of the present disclosure further includes an adhesive coated on the PET primarily twisted yarn and on the aramid primarily twisted yarn in order to increase the force of adhesion with other components of the tire. The adhesive includes at least one of a resorcinol-formaldehyde-latex (RFL) adhesive and an epoxy-based adhesive.

According to an embodiment of the present disclosure, the hybrid tire cord has a strength at break of 8.0 to 15.0 g/d and an elongation at break of 5 to 15%. More specifically, the hybrid tire cord according to the embodiment of the present disclosure may have a strength at break of 10.0 to 15.0 g/d and an elongation at break of 5 to 15%. The strength at break and the elongation at break may be measured according to ASTM D885.

The hybrid tire cord according to the embodiment of the present disclosure has a strength retention rate of 80% or higher. The strength retention rate is a strength retention rate after disk fatigue testing performed according to the JIS-L 1017 method of the Japanese Standards Association (JSA). A hybrid cord having a high strength retention rate of 80% or higher may be manufactured using a manufacturing method according to an embodiment of the present disclosure.

In addition, the hybrid tire cord according to the embodiment of the present disclosure has a high strength of 30 kgf or higher, measured according to ASTM D885.

The hybrid tire cord according to the embodiment of the present disclosure may be used for a high-performance lightweight tire. In addition, the hybrid tire cord according to the embodiment of the present disclosure may be used as a reinforcement material for a high-pressure tire, since the hybrid tire cord has a high modulus, by which the hybrid tire cord guarantees excellent dimensional stability, which is required of the high-pressure tire.

For example, according to an embodiment of the present disclosure, a hybrid tire cord for a high-performance lightweight tire may have 3% LASE of 6 kgf or more, 5% LASE of 10 kgf or more, and 7% LASE of 17 kgf or more, measured according to ASTM D885. In addition, a hybrid tire cord that is applied to a high-pressure tire may be manufactured, for example, using PET primarily twisted yarn having 1300 denier or more and aramid primarily twisted yarn having 1500 denier or more, and may have 3% LASE of 8 kgf or more, 5% LASE of 15 kgf or more, and 7% LASE of 25 kgf or more, measured according to ASTM D885.

The dry heat shrinkage of the hybrid tire cord according to the embodiment of the present disclosure, measured under conditions of a temperature of 180° C., a time of 2 minutes, and a primary load of 0.01 g/d, may be 0.3 to 2.5%.

The hybrid tire cord according to the embodiment of the present disclosure described above may be applied to a carcass of a tire so as to be used as a hybrid tire cord for carcasses according to another embodiment of the present disclosure.

A carcass is a frame of a tire that supports the load of a vehicle body and maintains the air pressure in the tire, and is configured to have a structure that surrounds the entire surface of the tire. In order to reduce the weight of the tire, therefore, it is necessary to reduce the weight of the carcass. In order to reduce the weight of the carcass, it is necessary to reduce the number of carcass reinforcement layers or to reduce the thickness of each of the carcass reinforcement layers. To this end, it is necessary to improve the performance of the tire cord for carcasses.

In general, polyethylene terephthalate (PET) and rayon are used as materials for the tire cord for carcasses. The strength and modulus of each of PET and rayon are insufficient to reduce the number of carcass reinforcement layers or to reduce the thickness of each of the carcass reinforcement layers.

In recent years, a hybrid tire cord made of nylon and aramid has been developed for use as a cap ply. In this hybrid tire cord, however, the physical properties of nylon initially appear in an S-S curve pattern, whereby the modulus of the hybrid tire cord is low. The carcass serves as the overall frame of the tire and thus has a great influence on the stability in the shape (dimensional stability) of the tire. In the case in which the initial modulus is low, therefore, the tire is deformed due to low stability in the shape of the tire at the time of manufacturing the tire. For this reason, it is known that a hybrid tire cord made of nylon and aramid is not suitable for the carcass.

In particular, as the demand for sport utility vehicles (SUVs) and light trucks (LTs) has increased, there is higher necessity for a high-strength, high-modulus tire cord that is suitable for a high-pressure tire capable of withstanding higher load than a tire for general vehicles and guaranteeing stability in travel while exhibiting considerably high dimensional stability.

In consideration of all structural aspects, such as the physical properties of materials, and the linear density, the twist number, and the shape of each primarily twisted yarn, a hybrid tire cord according to an embodiment of the present disclosure may be used as a hybrid tire cord for carcasses according to another embodiment of the present disclosure. The hybrid tire cord for carcasses according to the embodiment of the present disclosure may maintain the shape of a tire and improve the travel performance of a vehicle.

Another embodiment of the present disclosure provides a method of manufacturing a hybrid tire cord.

The method of manufacturing the hybrid tire cord according to the embodiment of the present disclosure includes primarily twisting aramid filaments in a first direction to form aramid primarily twisted yarn, primarily twisting PET filaments in a second direction to form PET primarily twisted yarn, secondarily twisting the aramid primarily twisted yarn and the PET primarily twisted yarn with each other in a third direction to form cabled yarn, dipping the cabled yarn in an adhesive solution, drying the cabled yarn penetrated with the adhesive solution as the result of being dipped, and heat treating the dried cabled yarn.

Hereinafter, the method of manufacturing the hybrid tire cord according to the embodiment of the present disclosure will be described in more detail.

First, aramid filaments having 400 to 3000 denier and PET filaments having 400 to 3000 denier are introduced into a cable cord twisting machine that is capable of performing both primary twisting and secondary twisting. In the twisting machine, primarily twisting the aramid filament in the first direction to form aramid primarily twisted yarn (first step) and primarily twisting the PET filament in the second direction to form PET primarily twisted yarn (second step) are performed simultaneously, and secondarily twisting the aramid primarily twisted yarn and the PET primarily twisted yarn with each other in the third direction to form cabled yarn (third step) is performed.

Meanwhile, PET primarily twisted yarn having 1300 to 3000 denier and aramid primarily twisted yarn having 1500 to 3000 denier may be used in order to manufacture a hybrid tire cord for high-pressure tires.

The steps of forming the primarily twisted yarns (first step and the second step) and the step of forming the cabled yarn (third step) are performed using a single twisting machine. In addition, the step of forming the cabled yarn (third step) is performed successively with the steps of forming the primarily twisted yarns (first step and the second step). That is, the third step is performed successively with the first step and the second step.

As described above, the second direction is the same as the first direction, and the third direction is opposite the first direction. The same twist number is applied within a range of 200 to 500 TPM when primary twisting and secondary twisting are performed.

According to another embodiment of the present disclosure, the cabled yarn is manufactured using a continuous type method in which primary twisting and secondary twisting are performed in a single twisting machine, whereby the productivity of the hybrid tire cord may be improved compared to a batch type method in which the PET filaments and the aramid filaments are primarily twisted using different twisting machines and then the PET primarily twisted yarn and the aramid primarily twisted yarn are secondarily twisted with each other using an additional twisting machine.

According to another embodiment of the present disclosure, the tension applied to the PET filament at the step of forming the PET primarily twisted yarn (second step) is lower than the tension applied to the aramid filament at the step of forming the aramid primarily twisted yarn (first step). Even though primary twisting and secondary twisting are performed using a single twisting machine, therefore, the length of the aramid primarily twisted yarn may be slightly less than the length of the PET primarily twisted yarn when a predetermined length of the cabled yarn (raw cord) is untwisted.

According to another embodiment of the present disclosure, the tension applied to the PET filament at the second step is lower than the tension applied to the aramid filament at the first step such that the length of the PET primarily twisted yarn becomes 1.005 to 1.050 times the length of the aramid primarily twisted yarn after a predetermined length of the cabled yarn (raw cord) is untwisted. For example, the tension applied to the PET filaments at the step of forming the PET primarily twisted yarn (second step) may be adjusted so as to become 50% to 95% of the tension applied to the aramid filament at the step of forming the aramid primarily twisted yarn (first step).

The tension applied to the PET filament and to the aramid filament may be adjusted by appropriately setting the number of revolutions per minute (rpm) of each roll of the twisting machine. For example, the tension applied to the PET filaments and the tension applied to the aramid filaments may be adjusted by appropriately setting the creel yarn tension and the inner yarn tension of the twisting machine.

Each of the aramid primarily twisted yarn and the PET primarily twisted yarn, manufactured as described above, may have 400 to 3000 denier. Meanwhile, in order to manufacture a hybrid tire cord for high-pressure tires, the PET primarily twisted yarn may have 1300 to 3000 denier, and the aramid primarily twisted yarn may have 1500 to 3000 denier. In addition, the aramid primarily twisted yarn and the PET primarily twisted yarn may have the same or similar denier within a range of 1500 to 3000 denier.

Subsequently, a step of dipping the cabled yarn (raw cord) in an adhesive solution, a step of drying the cabled yarn penetrated with the adhesive solution, and a step of heat treating the dried cabled yarn are successively performed to manufacture a hybrid tire cord (i.e. dip cord) according to an embodiment of the present disclosure.

The adhesive solution may include at least one of a resorcinol-formaldehyde-latex (RFL) adhesive and an epoxy-based adhesive.

The temperate and the time at the drying step may be changed depending on the composition of the adhesive solution. For example, drying may be performed at 70 to 200° C. for 30 to 120 seconds.

Heat treating may be performed at 200 to 250° C. for 30 to 120 seconds.

At this time, the dipping step, the drying step, and the heat treating step may be successively performed.

The adhesive component in the adhesive solution is coated on the surface of the cabled yarn (raw cord) through the above processes, thereby improving adhesion between a hybrid tire cord according to an embodiment of the present disclosure and a rubber composite for manufacturing a tire.

Meanwhile, even though the twisting machine is set so as to perform primary twisting and secondary twisting with the same twist number, an untwisting phenomenon may occur while the cabled yarn (i.e. the raw cord), manufactured by the twisting machine, is dipped in the adhesive solution, dried, and heat treated. In order to minimize the untwisting phenomenon and to prevent excessive contraction of the PET primarily twisted yarn, the tension applied to the cabled yarn (raw cord) may be adjusted so as to become 0.4 kg/cord or higher at the dipping step, the drying step, and the heat treating step, which are successively performed. Consequently, a difference between the initially set twist number and the actual twist number of the finally manufactured hybrid tire cord may be adjusted so as to become less than 15% of the initially set twist number.

According to an embodiment of the present disclosure, poor twisting may be remarkably reduced during the twisting process, and the cabled yarn may have a stable structure, whereby it is possible to minimize variation in the physical properties of the hybrid tire cord due to the nonuniform shape thereof. Specifically, in the case of a plurality of hybrid tire cords according to the present disclosure manufactured under the same conditions, the difference in each physical property thereof between the maximum value and the minimum value may be remarkably reduced. For example, the difference in strength at break between the maximum value and the minimum value is 3 g/d or less, and the difference in elongation at break between the maximum value and the minimum value is 5% or less.

Hereinafter, the effects of the present disclosure will be described with reference to examples of the present disclosure and comparative examples. However, the following examples are provided only for helping the comprehension of the present disclosure, and do not limit the scope of rights of the present disclosure.

Example 1

PET filaments having 1000 denier and aramid filaments having 1000 denier were introduced into a cable cord twisting machine (Cable Corder made by Allma Company), and Z-directional primary twisting and S-directional secondary twisting were simultaneously and successively performed to manufacture 2-ply cabled yarn (i.e. raw cord). At this time, the cable cord twisting machine was set so as to perform primary twisting and secondary twisting with a twist number of 460 TPM, and the tension applied to each of the PET filaments and the aramid filaments was adjusted such that the ratio of the length of the PET primarily twisted yarn to the length of the aramid primarily twisted yarn in the cabled yarn (raw cord) (length of the PET primarily twisted yarn/the length of the aramid primarily twisted yarn) ($L_P/L_A$) was 1.005. In order to acquire the ratio of the length of the PET primarily twisted yarn to the length of the aramid primarily twisted yarn, a load of 0.05 g/d was applied to a sample of the cabled yarn (raw cord) having a length of 1 m in order to release and untwist the secondary twisting such that the aramid primarily twisted yarn and the PET primarily twisted yarn were separated from each other, and the length of the aramid primarily twisted yarn and the length of the PET primarily twisted yarn were measured in the state in which a load of 0.05 g/d was applied to each of the aramid primarily twisted yarn and the PET primarily twisted yarn.

Subsequently, the cabled yarn (raw cord) was dipped in a resorcinol-formaldehyde-latex (RFL) adhesive solution including 2.0 wt % of resorcinol, 3.2 wt % of formalin (37%), 1.1 wt % of sodium hydroxide (10%), 43.9 wt % of styrene/butadiene/vinylpyridine (15/70/15) rubber (41%), and water. The cabled yarn (raw cord) penetrated with the RFL solution as the result of being dipped was dried at 150° C. for 100 seconds and was then heat treated at 240° C. for 100 seconds to manufacture a hybrid tire cord, i.e. a dip cord. The tension applied to the cabled yarn during the dipping, drying, and heat treating processes was 0.5 kg/cord.

Example 2

A hybrid tire cord (dip cord) was manufactured using the same method as in Example 1, except that the ratio of the length of the PET primarily twisted yarn to the length of the aramid primarily twisted yarn in the cabled yarn (raw cord) ($L_P/L_A$) was 1.010.

Example 3

A hybrid tire cord (dip cord) was manufactured using the same method as in Example 1, except that the ratio of the length of the PET primarily twisted yarn to the length of the aramid primarily twisted yarn in the cabled yarn (raw cord) ($L_P/L_A$) was 1.020.

Example 4

A hybrid tire cord (dip cord) was manufactured using the same method as in Example 1, except that the ratio of the length of the PET primarily twisted yarn to the length of the aramid primarily twisted yarn in the cabled yarn (raw cord) ($L_P/L_A$) was 1.030.

Example 5

A hybrid tire cord (dip cord) was manufactured using the same method as in Example 1, except that the ratio of the length of the PET primarily twisted yarn to the length of the aramid primarily twisted yarn in the cabled yarn (raw cord) ($L_P/L_A$) was 1.050.

Example 6

A PET filament having 1500 denier and an aramid filament having 1500 denier were introduced into a cable cord twisting machine (Cable Corder made by Allma Company), and Z-directional primary twisting and S-directional secondary twisting were simultaneously and successively performed to manufacture 2-ply cabled yarn (i.e. a raw cord). At this time, the cable cord twisting machine was set so as to perform primary twisting and secondary twisting with a twist number of 380 TPM, and the tension applied to each of the PET filaments and the aramid filaments was adjusted such that the ratio of the length of the PET primarily twisted yarn to the length of the aramid primarily twisted yarn in the cabled yarn (raw cord) (length of the PET primarily twisted yarn/the length of the aramid primarily twisted yarn) ($L_P/L_A$) was 1.03. In order to acquire the ratio of the length of the PET primarily twisted yarn to the length of the aramid primarily twisted yarn, a load of 0.05 g/d was applied to a sample of the cabled yarn (raw cord) having a length of 1 m in order to release and untwist the secondary twisting such that the aramid primarily twisted yarn and the PET primarily twisted yarn were separated from each other, and the length of the aramid primarily twisted yarn and the length of the PET primarily twisted yarn were measured in the state in which a load of 0.05 g/d was applied to each of the aramid primarily twisted yarn and the PET primarily twisted yarn.

Subsequently, the cabled yarn (raw cord) was dipped in a resorcinol-formaldehyde-latex (RFL) adhesive solution including 2.0 wt % of resorcinol, 3.2 wt % of formalin (37%), 1.1 wt % of sodium hydroxide (10%), 43.9 wt % of styrene/butadiene/vinylpyridine (15/70/15) rubber (41%), and water. The cabled yarn (raw cord) penetrated with the RFL solution as the result of being dipped was dried at 150° C. for 100 seconds and was then heat treated at 240° C. for 100 seconds to manufacture a hybrid tire cord. The tension applied to the cabled yarn during the dipping, drying, and heat treating processes was 0.5 kg/cord.

Example 7

A hybrid tire cord was manufactured using the same method as in Example 6, except that PET filaments having 2000 denier was used instead of the PET filaments having 1500 denier, aramid filaments having 2000 denier was used instead of the aramid filaments having 1500 denier, and the cable cord twisting machine was set so as to perform primary twisting and secondary twisting with a twist number of 300 TPM.

Example 8

A hybrid tire cord was manufactured using the same method as in Example 6, except that the ratio of the length of the PET primarily twisted yarn to the length of the aramid primarily twisted yarn in the cabled yarn (raw cord) ($L_P/L_A$) was 1.005.

Example 9

A hybrid tire cord was manufactured using the same method as in Example 6, except that the ratio of the length of the PET primarily twisted yarn to the length of the aramid primarily twisted yarn in the cabled yarn (raw cord) ($L_P/L_A$) was 1.05.

Comparative Example 1

A hybrid tire cord (dip cord) was manufactured using the same method as in Example 1, except that the cable cord twisting machine was set so as to perform primary twisting and secondary twisting with a twist number of 360 TPM, and the ratio of the length of the PET primarily twisted yarn to the length of the aramid primarily twisted yarn in the cabled yarn (raw cord) ($L_P/L_A$) was 0.980.

Comparative Example 2

A hybrid tire cord (dip cord) was manufactured using the same method as in Example 1, except that the cable cord twisting machine was set so as to perform primary twisting and secondary twisting with a twist number of 400 TPM, and the ratio of the length of the PET primarily twisted yarn to the length of the aramid primarily twisted yarn in the cabled yarn (raw cord) ($L_P/L_A$) was 0.980.

Comparative Example 3

A hybrid tire cord (dip cord) was manufactured using the same method as in Example 1, except that the cable cord twisting machine was set so as to perform primary twisting and secondary twisting with a twist number of 430 TPM, and the ratio of the length of the PET primarily twisted yarn to the length of the aramid primarily twisted yarn in the cabled yarn (raw cord) ($L_P/L_A$) was 0.980.

Comparative Example 4

A hybrid tire cord (dip cord) was manufactured using the same method as in Example 1, except that the ratio of the length of the PET primarily twisted yarn to the length of the aramid primarily twisted yarn in the cabled yarn (raw cord) ($L_P/L_A$) was 0.980.

Comparative Example 5

A hybrid tire cord (dip cord) was manufactured using the same method as in Example 6, except that the ratio of the length of the PET primarily twisted yarn to the length of the aramid primarily twisted yarn in the cabled yarn (raw cord) ($L_P/L_A$) was 1.000.

Comparative Example 6

A hybrid tire cord (dip cord) was manufactured using the same method as in Example 6, except that the ratio of the length of the PET primarily twisted yarn to the length of the aramid primarily twisted yarn in the cabled yarn (raw cord) ($L_P/L_A$) was 0.98.

Examples 1 to 9 and Comparative Examples 1 to 6 are summarized in Table 1 below.

TABLE 1

| | Denier of PET primarily twisted yarn | Denier of aramid primarily twisted yarn | Number of primary/ secondary twists (TPM) | ($L_P/L_A$) (Raw Cord) |
|---|---|---|---|---|
| Example 1 | 1000 | 1000 | 460 | 1.005 |
| Example 2 | 1000 | 1000 | 460 | 1.010 |
| Example 3 | 1000 | 1000 | 460 | 1.020 |
| Example 4 | 1000 | 1000 | 460 | 1.030 |
| Example 5 | 1000 | 1000 | 460 | 1.050 |
| Example 6 | 1500 | 1500 | 380 | 1.030 |
| Example 7 | 2000 | 2000 | 300 | 1.030 |
| Example 8 | 1500 | 1500 | 380 | 1.005 |
| Example 9 | 1500 | 1500 | 380 | 1.050 |
| Comparative Example 1 | 1000 | 1000 | 360 | 0.980 |
| Comparative Example 2 | 1000 | 1000 | 400 | 0.980 |
| Comparative Example 3 | 1000 | 1000 | 430 | 0.980 |
| Comparative Example 4 | 1000 | 1000 | 460 | 0.980 |
| Comparative Example 5 | 1500 | 1500 | 380 | 1.000 |
| Comparative Example 6 | 1500 | 1500 | 380 | 0.980 |

For the hybrid tire cords (dip cords) manufactured according to Examples 1 to 9 and Comparative Examples 1 to 6, (i) the ratio of the length of the aramid primarily twisted yarn to the length of the PET primarily twisted yarn (length of the aramid primarily twisted yarn/the length of the PET primarily twisted yarn) ($L_A/L_P$), (ii) strength, elongation at specific load (at 4.5 kg), and elongation at break, (iii) 3% LASE, 5% LASE, and 7% LASE, (iv) dry heat shrinkage, and (v) the strength retention rate after disk fatigue testing were measured using the following methods, and the results are shown in Table 2.

(i) The ratio of the length of the aramid primarily twisted yarn to the length of the PET primarily twisted yarn ($L_A/L_P$)

A load of 0.05 g/d was applied to samples of the hybrid tire cord having a length of 1 m in order to release and untwist the secondary twisting such that the aramid primarily twisted yarn and the PET primarily twisted yarn were separated from each other, and the length of the aramid primarily twisted yarn and the length of the PET primarily twisted yarn were measured in the state in which a load of 0.05 g/d was applied to each of the aramid primarily twisted yarn and the PET primarily twisted yarn.

Subsequently, the value of "the length of the aramid primarily twisted yarn/the length of the PET primarily twisted yarn)" ($L_A/L_P$) was calculated.

(ii) Strength (kgf), elongation at specific load (at 4.5 kg) (%), and elongation at break (%)

10 samples having a length of 250 mm were tensioned at a cross-head speed of 300 m/min using Instron Tester (Instron Engineering Corp., Canton, Mass.) according to ASTM D-885 testing method in order to measure the strength, elongation at specific load (at 4.5 kg), and elongation at break thereof. Subsequently, the average of each of the strength, elongation at specific load (at 4.5 kg), and elongation at break of the 10 samples was calculated in order to determine the strength, elongation at specific load (at 4.5 kg), and elongation at break of the hybrid tire cord (dip cord).

(iii) 3% LASE, 5% LASE, and 7% LASE 10 samples having a length of 250 mm were tensioned at a cross-head speed of 300 m/min using Instron Tester (Instron Engineering Corp., Canton, Mass.) according to the ASTM D-885 testing method in order to measure 3% LASE, 5% LASE, and 7% LASE of the hybrid tire cord. Subsequently, the average of each of 3% LASE, 5% LASE, and 7% LASE of the 10 samples was calculated in order to obtain 3% LASE, 5% LASE, and 7% LASE of the hybrid tire cord.

(iv) Dry Heat Shrinkage

Samples were placed under atmospheric conditions of a temperature of 25° C. and a relative humidity of 65% for 24 hours, and then the dry heat shrinkage of the samples was measured using a Testrite instrument under conditions of a temperature of 180° C., a time of 2 minutes, and a primary load of 0.01 g/d (20 g).

(v) Strength Retention Rate after Disk Fatigue Testing

The hybrid tire cord (dip cord), the strength (strength before fatigue) of which was measured, was vulcanized with rubber to manufacture samples, and the samples were repeatedly tensioned and contracted within a range of ±8% for 16 hours while the samples were rotated at a speed of 2500 rpm at 80° C. using a disk fatigue tester according to the JIS-L 1017 method of the Japanese Standards Association (JSA) such that the samples were fatigued. Subsequently, the rubber was removed from the samples, and then the strength after fatigue of the hybrid tire cord (dip cord) was measured. The strength retention rate defined by Equation 1 below was calculated based on the strength before fatigue and the strength after fatigue.

strength retention rate (%)=[strength after fatigue (kgf)/strength before fatigue (kgf)]×100   <Equation 1>

Here, the strength before fatigue (kgf) and the strength after fatigue (kgf) were obtained by measuring the strength at break of samples having a length of 250 mm while tensing the samples at a cross-head speed of 300 m/min using Instron Tester (Instron Engineering Corp., Canton, Mass.) according to ASTM D-885 testing method.

TABLE 2

|  | ($L_A/L_P$) | Strength (kgf) | Elongation at specific load (%) | Elongation at break (%) | 3% LASE (kgf) | 5% LASE (kgf) | 7% LASE (kgf) | Dry heat shrinkage (%) | Strength retention rate (%) |
|---|---|---|---|---|---|---|---|---|---|
| Example 1 | 1.000 | 24.1 | 2 | 9.3 | 6.9 | 12.5 | 18.9 | 1.02 | 90.3 |
| Example 2 | 1.010 | 25.6 | 1.9 | 9.3 | 7.0 | 12.4 | 18.7 | 1.02 | 92.5 |
| Example 3 | 1.010 | 24.6 | 2 | 8.9 | 6.8 | 12.6 | 18.8 | 0.96 | 96.4 |
| Example 4 | 1.020 | 24.7 | 1.9 | 8.9 | 7.0 | 12.8 | 19.6 | 0.96 | 98.7 |
| Example 5 | 1.025 | 24.2 | 1.7 | 7.2 | 7.9 | 15.0 | 22.9 | 0.89 | 95.1 |
| Example 6 | 1.02 | 38.4 | 1.4 | 9.3 | 10.7 | 17.8 | 27.6 | 1.71 | 85.6 |
| Example 7 | 1.025 | 45.1 | 0.9 | 8.8 | 14.9 | 23.6 | 35.4 | 0.89 | 86.4 |
| Example 8 | 1.035 | 37.2 | 1.4 | 9.5 | 9.3 | 16.6 | 26.1 | 1.56 | 81.4 |
| Example 9 | 1.00 | 38.3 | 1.4 | 8.9 | 12.1 | 19.3 | 28.7 | 1.44 | 80.2 |
| Comparative Example 1 | 1.100 | 26.3 | 1.8 | 7.7 | 7.6 | 14.9 | 23.8 | 0.85 | 41.6 |
| Comparative Example 2 | 1.070 | 23.6 | 2.2 | 8.6 | 7.3 | 14.5 | 23.5 | 0.8 | 59.9 |
| Comparative Example 3 | 1.070 | 23.5 | 2.3 | 9.1 | 7.0 | 14.1 | 23.2 | 0.88 | 53.9 |
| Comparative Example 4 | 1.100 | 22.6 | 2.5 | 13.1 | 6.8 | 13.9 | 22.8 | 0.87 | 68.1 |
| Comparative Example 5 | 1.07 | 35.4 | 1.6 | 9.9 | 9.9 | 16.7 | 26.2 | 0.84 | 42.5 |
| Comparative Example 6 | 1.10 | 32.1 | 1.6 | 10.3 | 9.5 | 16.2 | 25.5 | 0.83 | 40.1 |

Referring to Table 1 and Table 2, each of the hybrid tire cords manufactured according to Comparative Examples 1 to 6 has a strength retention rate of less than 70%. In contrast, it can be seen that each of the hybrid tire cords manufactured using the manufacturing method according to the embodiment of the present disclosure (Examples 1 to 9) has a strength retention rate of 80% or more. The hybrid tire cords according to Examples 1 to 9 having this physical property may be usefully applied to a high-performance lightweight tire.

In addition, it can be seen that each of the hybrid tire cords according to Examples 1 to 9 has 3% LASE of 8 kgf or more, 5% LASE of 15 kgf or more, and 7% LASE of 25 kgf or more, measured according to ASTM D885, in addition to a strength retention rate of 80% or more. The hybrid tire cords according to Examples 1 to 9 may be used as a reinforcement material for a high-pressure tire, and may be used particularly for a carcass of the high-pressure tire.

The invention claimed is:

1. A hybrid tire cord comprising:
   PET primarily twisted yarn;
   aramid primarily twisted yarn; and
   an heat treated adhesive coated on a raw cord which is formed by secondarily twisting the PET primarily twisted yarn with the aramid primarily twisted yarn,
   wherein a length of the aramid primarily twisted yarn is 1 to 1.035 times a length of the PET primarily twisted yarn after a predetermined length of the hybrid tire cord is untwisted,
   wherein
   the PET primarily twisted yarn is made of PET filaments, the PET filaments together total having 1300 to 3000 denier, and
   the aramid primarily twisted yarn is made of aramid filaments, the aramid filaments together total having 1500 to 3000 denier.

2. The hybrid tire cord according to claim 1, wherein
   the PET primarily twisted yarn has a first twisting direction,
   the aramid primarily twisted yarn has a second twisting direction,
   the PET primarily twisted yarn and the aramid primarily twisted yarn are secondarily twisted with each other in a third twisting direction,
   the second twisting direction is a same as the first twisting direction, and
   the third twisting direction is opposite the first twisting direction.

3. The hybrid tire cord according to claim 1, wherein each of the PET primarily twisted yarn and the aramid primarily twisted yarn, before being secondarily twisted, has a first twist number of 200 to 500 TPM.

4. The hybrid tire cord according to claim 3, wherein
   the PET primarily twisted yarn and the aramid primarily twisted yarn are secondarily twisted with each other so as to have a second twist number, and
   the second twist number is a same as the first twist number.

5. The hybrid tire cord according to claim 1, wherein a weight ratio of the aramid primarily twisted yarn to the PET primarily twisted yarn is 20:80 to 80:20.

6. The hybrid tire cord according to claim 5, wherein the weight ratio of the aramid primarily twisted yarn to the PET primarily twisted yarn is 1:3 to 3:1.

7. The hybrid tire cord according to claim 1, wherein the hybrid tire cord has a strength at break of 8.0 to 15.0 g/d, measured according to ASTM D885, and an elongation at break of 5 to 15%, measured according to ASTM D885.

8. The hybrid tire cord according to claim 1, wherein a strength retention rate of the hybrid tire cord after disk fatigue testing, performed according to a JIS-L 1017 method of Japanese Standards Association (JSA), is 80% or higher.

9. The hybrid tire cord according to claim 1, wherein the hybrid tire cord has 3% LASE of 6 kgf or more, 5% LASE of 10 kgf or more, and 7% LASE of 17 kgf or more, measured according to ASTM D885.

10. The hybrid tire cord according to claim 9, wherein the hybrid tire cord has 3% LASE of 8 kgf or more, 5% LASE of 15 kgf or more, and 7% LASE of 25 kgf or more, measured according to ASTM D885.

11. The hybrid tire cord according to claim 1, wherein a dry heat shrinkage of the hybrid tire cord, measured under conditions of a temperature of 180° C., a time of 2 minutes, and a primary load of 0.01 g/d, is 0.3 to 2.5%.

12. A method of manufacturing a hybrid tire cord, the method comprising:
    primarily twisting aramid filaments in a first direction to form aramid primarily twisted yarn;
    primarily twisting PET filaments in a second direction to form PET primarily twisted yarn;
    secondarily twisting the aramid primarily twisted yarn and the PET primarily twisted yarn with each other in a third direction to form a raw cord;
    dipping the raw cord in an adhesive solution;
    drying the raw cord penetrated with the adhesive solution as a result of being dipped; and
    heat treating the dried raw cord,
    wherein the second direction is a same as the first direction, and the third direction is opposite the first direction,
    wherein tension applied to the PET filaments in forming the PET primarily twisted yarn is lower than a tension applied to the aramid filaments in forming the aramid primarily twisted yarn such that the length of the aramid primarily twisted yarn is less than the length of the PET primarily twisted yarn when a predetermined length of the raw cord is untwisted, and
    wherein, after the heat treating, a length of the aramid primarily twisted yarn, measured after the hybrid tire cord is untwisted, is 1 to 1.035 times a length of the PET primarily twisted yarn,
    wherein
    the PET primarily twisted yarn is made of PET filaments, the PET filaments together total having 1300 to 3000 denier, and
    the aramid primarily twist yarn is made of aramid filaments, the aramid filaments together total having 1500 to 3000 denier.

13. The method according to claim 12, wherein a length of the PET primarily twisted yarn is 1.005 to 1.050 times a length of the aramid primarily twisted yarn after a predetermined length of the raw cord, formed at the step of forming the raw cord, is untwisted.

14. The method according to claim 12, wherein a tension applied to the PET filament in forming the PET primarily twisted yarn is 50% to 95% of a tension applied to the aramid filament in forming the aramid primarily twisted yarn.

15. The method according to claim 12, wherein forming the aramid primarily twisted yarn, forming the PET primarily twisted yarn and forming the raw cord are performed in a single twisting machine.

16. The method according to claim 12, wherein forming the aramid primarily twisted yarn and the PET primarily twisted yarn, and forming the raw cord are successively performed.

17. The method according to claim 12, wherein the adhesive solution comprises at least one of a resorcinol-formaldehyde-latex (RFL) adhesive and an epoxy-based adhesive.

18. The method according to claim 12, wherein the drying is performed at 70 to 200° C. for 30 to 120 seconds, and the heat treating is performed at 200 to 250° C. for 30 to 120 seconds.

19. The method according to claim 12, wherein
- the dipping, the drying, and the heat treating step are successively performed, and
- a tension applied to the raw cord at the dipping, the drying, and the heat treating is 0.4 kg/cord or higher.

\* \* \* \* \*